July 29, 1941.  H. S. RIDDLE  2,250,967

METHOD OF PRODUCING TUBULAR ARTICLES

Filed Sept. 7, 1938

INVENTOR
Herbert S. Riddle
By Dike, Calver & Gray
Attys.

Patented July 29, 1941

2,250,967

UNITED STATES PATENT OFFICE 2,250,967

METHOD OF PRODUCING TUBULAR ARTICLES

Herbert S. Riddle, Springfield, Mass., assignor to Monsanto Chemical Company, St. Louis, Mo., a corporation of Delaware Application September 7, 1938, Serial No. 228,803

1 Claim. (Cl. 18—59)

This invention relates to the manufacture of tubular articles which can be used, for example, for the body of pens, pencils and the like.

It has been discovered that tubular articles of this general type may be produced economically by winding a flexible rod of small cross section upon a mandrel and cementing the windings together. The tubular article produced may have any desired configuration, such as a longitudinal taper, depending upon the shape of the mandrel. If desired, a collapsible mandrel may be employed to facilitate removal of the tubular article. When the flexible rod employed is a plastic material, such as cellulose nitrate or other cellulose derivative or a synthetic resin or the like, the windings may be secured together by dipping in a solvent for the plastic material and then drying the article. The article may be colored by incorporating a color in a cement or solvent.

The article thus produced has a wavy or ribbed outer surface and these waves or ribs, when transparent, function like lenses to give the article a different appearance with a change in the angle at which it is viewed. This distinctive appearance is particularly pronounced if the transparent flexible rod is wound upon a colored or reflecting tube or a tube having colored bands. The ribs or waves upon the article may be produced mechanically in other ways, such as by machining, molding or the like.

The invention will be more clearly understood from the following description in conjunction with the accompanying drawing: in which, Fig. 1 is a plan view of a mandrel for use in the practice of the invention;

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
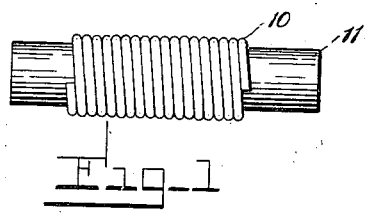

Referring to Fig. 1 of the accompanying drawing, the preferred practice in producing an article in accordance with the invention comprises winding an extruded filament or rod 10 of plastic material upon a mandrel 11 having a diameter or general shape conforming to the inner surface of the article to be produced. In making tubular articles such as fountain pen bodies, a plastic rod 10 having a diameter of about 0.03" has been found particularly suitable. After the rod 10 has been wound upon the mandrel, the windings may be secured together by dipping in a cement or solvent for the plastic material and drying. The tubular article thus produced may now be removed from the mandrel and subjected to trimming or other finishing operations. While it is at present preferred to employ a cement or solvent for the plastic material for securing the windings together, it will be understood that other means may be employed for this purpose, such as cementing by heat sealing procedures in which the plastic material is softened by heat rather than by the application of solvent. The article may be colored by incorporating a color in the cement or solvent.

Figure 2:
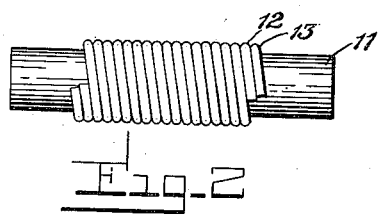
Fig. 2 is a view similar to Fig. 1 illustrating a modified practice of the invention.

Instead of using a single rod as illustrated in Fig. 1, two or more flexible rods may be employed which are wound simultaneously upon the mandrel as illustrated by the rods 12 and 13 in Fig. 2. The rod 12 is a transparent water white rod of plastic material while the rod 13 may be the same or may be colored. The article then is completed as described above.

Figure 3:
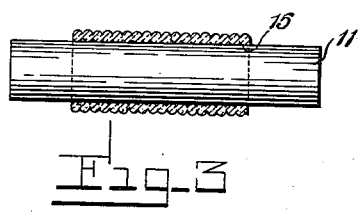
Figs. 3 and 4 are longitudinal sectional views of the articles produced as illustrated in Figs. 1 and 2, respectively.
Figure 4:
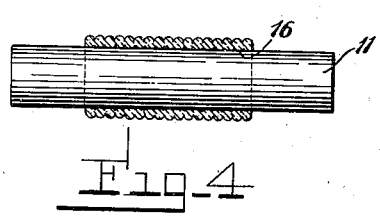

The article produced by the methods illustrated in Figs. 1 and 2 will have somewhat the appearance illustrated in section in Figs. 3 and 4, respectively. The inner surface 15 as illustrated in Fig. 3 and the inner surface 16 as illustrated in Fig. 4 will be ribbed due to the shape of the rods 10, 12 and 13, but the size of the ribs will depend upon the tension applied to the rods during winding and to other conditions encountered during the making of the article, such as the nature of the cement or solvent employed and the length of time that the article is allowed to remain in the solvent.

Figure 5:
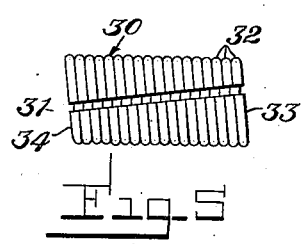
Fig. 5 is a plan view of the article produced as illustrated in Fig. 1, illustrating its use in the production of a tubular article having a different appearance.
Figure 6:
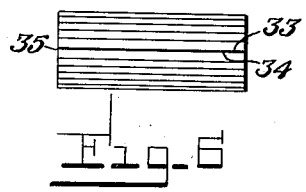
Fig. 6 is a plan view of the article shown in Fig. 5, illustrating a further step in the method of the invention.

In the articles produced as described above, the ribs upon the outer surface are of spiral configuration. Such an article as illustrated in Fig. 5 at 30 may be split longitudinally as indicated at 31 along a line substantially perpendicular to the direction of the ribs 32 to form a sheet having longitudinally extending ribs. This sheet may then be curled to bring opposite edges 33 and 34 together as illustrated in Fig. 6. The edges 33 and 34 may then be secured by dipping in a solvent for the plastic material to form a tube having a seam 35 and longitudinally extending ribs.

Figure 7:
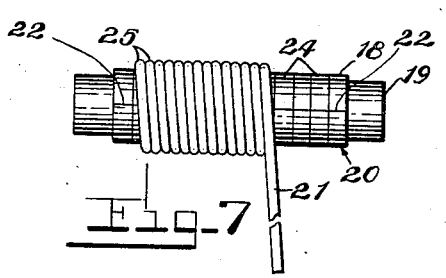
Fig. 7 is a plan view of a mandrel illustrating the method of producing a tubular article having a still different appearance.

In accordance with a modified practice of the invention as illustrated in Fig. 7, a sheet 18 of plastic material, such as cellulose nitrate, may be curled over a cylindrical mandrel 19 to form a tube 20. A flexible transparent rod 21 of plastic material may then be wound over the tube 20. The article thus produced may then be dipped in a cement or a solvent for the plastic material of which the rod 21 and the tube 20 is made and the article dried. In this manner the windings formed by the rod 21 are secured together and the abutting edges of the sheet forming the tube 20 also are secured together to form a seam 22. Alternatively, the cement or solvent may be applied during the winding of the rod 21 to assure filling the voids between the windings and the tube 20. If desired, the tube 20 may be formed with spaced colored bands 24 to give the effect of color from within the tubular article produced. The ribs 25 upon the outer surface of the article act like a series of small lenses which tend to diffuse the colored bands 24 to a more or less extent depending upon the angle at which the article is viewed.

Figure 8:
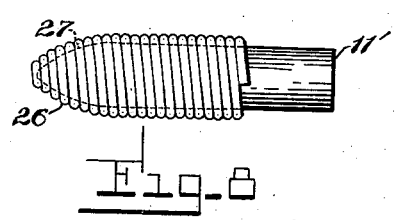
Fig. 8 is a plan view similar to Fig. 1 illustrating the making of a tubular article having a longitudinal taper.

In Fig. 8 the making of a tubular article having a longitudinal taper 26 is illustrated. This article is made in the same manner as described in connection with Figs. 1 and 2 except that the mandrel 11' is provided with a tapered portion 27.

The invention provides a method for producing hollow articles of distinctive appearance at low cost. The hollow article produced may be cylindrical, tapered or may have any conceivable irregular shape depending upon the shape of the mandrel upon which the small flexible rod is wound. The windings of the rod will conform accurately to the shape of the mandrel. Articles of such irregular shape could be produced prior to the present invention only by expensive machining or molding operations. While it had been proposed prior to the present invention to produce tubular articles of cylindrical form by winding a ribbon upon a cylindrical mandrel, this method is not applicable for the production of hollow articles of tapered or other irregular shape because the ribbon can not be made to conform accurately to the shape of a tapered or other irregular shaped mandrel.

I claim:

The method of producing a tube of plastic material of pleasing appearance which comprises winding at least one rod of plastic material upon a support, cementing the adjacent windings together, splitting the tube thus formed longitudinally to form a sheet, and shaping the sheet to tubular form and securing the abutting edges to provide a tube having longitudinally extending ribs.

HERBERT S. RIDDLE.